(No Model.)

J. T. LEIGHTON.
CAR WHEEL.

No. 284,028. Patented Aug. 28, 1883.

Witnesses:
Edmund Brodhag

Inventor:
James T. Leighton
by Johnson & Johnson
Attys.

UNITED STATES PATENT OFFICE.

JAMES T. LEIGHTON, OF NEW HAVEN, CONNECTICUT.

CAR-WHEEL.

SPECIFICATION forming part of Letters Patent No. 284,028, dated August 28, 1883.

Application filed February 21, 1883. (No model.)

*To all whom it may concern:*

Be it known that I, JAMES THOMPSON LEIGHTON, a citizen of the United States, residing at New Haven, in the county of New Haven and State of Connecticut, have invented new and useful Improvements in Car-Wheels, of which the following is a specification.

My invention is directed to the production of an improved car-wheel in which a separate webbed tire is used; and the objects of my improvements are to increase the durability and safety of the wheel. A webbed tire and a webbed hub are combined with separate webbed spokes of wrought-iron, in which the face-web of each spoke is interlocked with the web of the hub, and the flat base of the spokes abut at their edges and are locked with their ends within a circumferential groove of the hub, producing a very durable and safe wrought-iron body or center. A safety steel ring is combined with the tire-web and with the spokes, being placed between them and embedded in face-grooves in the tire-web, between the tire and the bolts which secure the tire to the spokes, whereby to form a circular tie or retaining-ring for the tire in case of breaking across the tread; and it is in such case that the safety-ring serves to hold the parts of the tire together. A center plate may be combined with the separate webbed spokes to re-enforce them and to form a solid center or body. These matters of improvement are illustrated in the accompanying drawings, and the following description, in connection therewith, will particularly point out such improvement or combination by specific and distinct claims, which the applicant regards as his invention.

Figure 1:
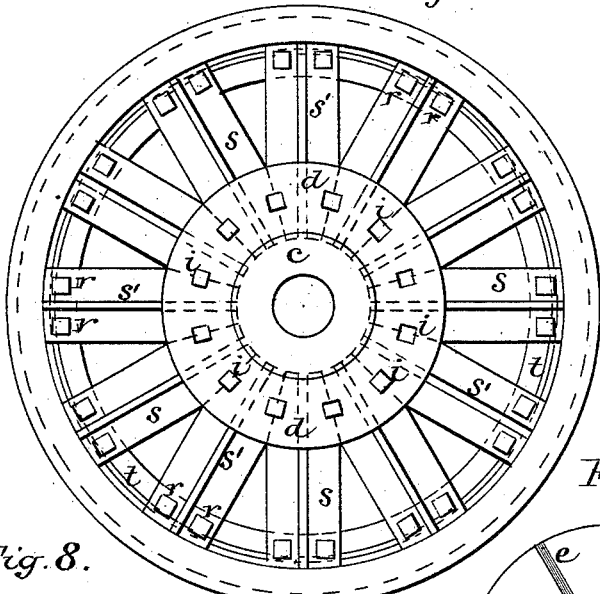
Figure 3:
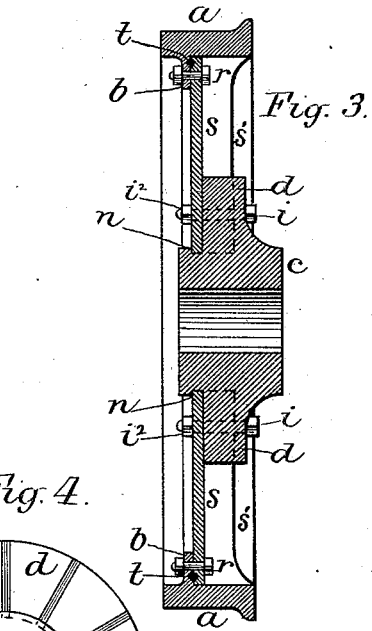
Figure 4:
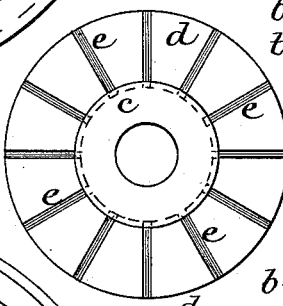
Figures 2, 6:
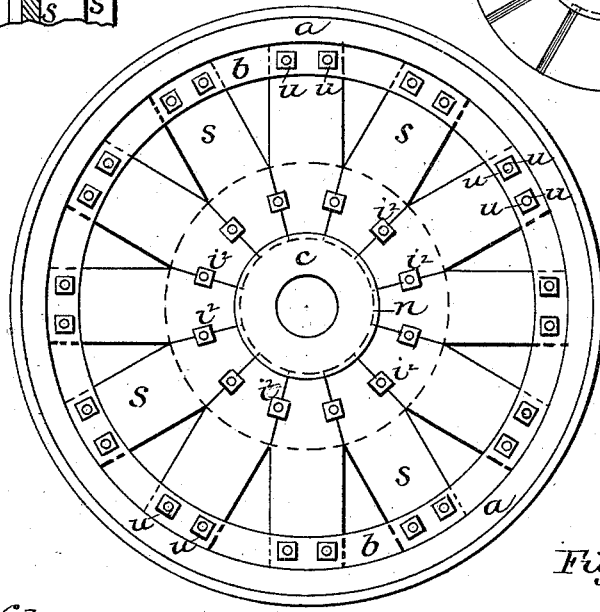
Figures 5, 7:

In the said drawings, Figure 1 represents the flanged face of a car-wheel constructed according to my invention; Fig. 2, the tread-face of the wheel; Fig. 3, a vertical section of the wheel; Fig. 4, an end view of the webbed hub, showing the grooves in the inner side of the web; Fig. 5, a top view of the same, showing one of the webbed spokes interlocked with web of the hub; Fig. 6, a vertical section of my improved wheel with a re-enforcing center plate, Fig. 7 views in cross-section of two forms of webbed spokes; and Fig. 8, a detail section, showing the embedded safety-ring more clearly.

The tire $a$ is preferably of steel, and is formed on its interior side with an inwardly-projecting web, $b$, of suitable thickness and width, which strengthens the tire, and to which the separate spokes are bolted. The hub $c$ is preferably of cast-iron, and is formed with a circumferential web, $d$, of suitable thickness and projection. The spokes $s$ are of wrought-iron, having a base or body preferably of plate form and one or more face-webs, $s'$, extending the length of the spoke. The spokes with these webs may be rolled in the same manner as T-rails. The T form of spoke shown is preferable; but they may be formed with an angle-web at each edge, as shown in Fig. 7. The inner face of the hub-web $d$ is formed with radial grooves $e$, adapted to receive the webs $s'$ of the spokes, so that the base or body $s$ of each spoke fits against the inner face of the hub-web, with the spoke-webs interlocked solidly into the hub-web grooves. Joining the inner face of the hub-web, and at the junction thereof with the hub, the latter is formed with a circumferential groove, $n$, to receive the inner ends of the spokes proper, which are thereby interlocked with the hub $c$ and with the hub-web $d$, as shown in Figs. 3, 4, and 5. The inner ends of the spokes taper and their edges abut against each other a distance about equal to the projection of the hub-web, as shown in Fig. 2, making, in fact, the hub, its web, and the spokes a solid structure when the spokes are bolted to the hub-web. The bolts $i$ for this purpose are preferably placed at the joints of the spokes, so that the bolt-nuts $i^2$ lap such joints and give a secure fastening for each spoke of the hub-web. The outer ends of the spokes fit solidly against the inner side of the tire and against the outer face of the web $b$ of the tire, to which each spoke is bolted by two bolts, $r$, and nuts $u$, giving a secure fastening of the spokes to the tire. A safety-ring, $t$, of steel, is fastened in a groove in the face of the tire-web by being clamped therein between the inner side of the tire and the bolts by which it is fastened to the spokes, so as to form a safety-tie for the tire in case of its breakage crosswise. In this function the safety-ring will hold the tire-sections together by the tire-web. The groove for receiving this safety-ring may be formed entirely in the face of the tire-web, or partly in the contiguous faces of the tire-web and spokes, as shown. The spokes may be webbed on both sides, if desired, as shown in Fig. 7.

A re-enforcing center plate or body, $f$, may be combined with the spokes, the hub, and the tire, as shown in Fig. 6, the bolts which secure the spokes serving also to secure the re-enforcing plate, and thus make the wheel solid; but for locomotive-engines the open spoke-wheel is preferable. When using such re-enforcing center plate, it, like the spokes, is secured in the hub-groove $n$ and to the tire-web, and the safety-ring is secured in place between the tire-web and the said re-enforcing plate. The webs of the spokes increase their stiffness; and while webbed spokes have been used in a cast-iron center integral with the hub and with a separate webbed tire, I am not aware that wrought-iron webbed spokes have been used in combination with a separate webbed tire to produce the durable and safe wheel which I have devised. The tire can be removed when worn and a new one placed upon and secured to the spokes. The grooves can be formed, by a planing-tool, in the web of the hub of a depth just equal to the projection of the web of the spoke.

I claim—

1. The combination, in a car-wheel, of the tire having the outer edge flange and the inner web, $b$, with a separate hub, having the web $d$, and a circumferential groove at the base of said web, and the separate webbed spokes bolted to the rear side of the said hub-web and to the front side of said tire-web, and having their inner ends joining within the said circumferential hub-groove, substantially as described.

2. The combination, in a car-wheel, of separate wrought-iron webbed spokes with a separate hub provided with a circumferential groove, $n$, adapted to receive the ends of the spokes, and a web, $d$, provided with radial face-grooves adapted to receive the face-webs of the spokes, and a separate webbed tire, substantially as described, for the purpose specified.

3. The combination, in a car-wheel, of the separate tire having the web $b$, and the separate spokes secured thereto, with the safety steel ring $t$, secured to the said tire-web, substantially as described, for the purpose specified.

4. The herein-described car-wheel, consisting of the separate webbed tire, the separate webbed spokes, the separate webbed hub having the circumferential groove $n$, and the radial face-grooves $e$, and the safety-ring $t$, secured to the web of the tire, all constructed substantially as described, for the purpose specified.

5. The combination, in a car-wheel, of the separate webbed tire and the separate webbed hub with the separate webbed spokes and the re-enforcing plate or solid center, the spokes and the re-enforcing center plate being secured to the tire, to the hub, and to each other, substantially as described, for the purpose specified.

In testimony whereof I have hereunto set my hand in the presence of two subscribing witnesses.

JAMES T. LEIGHTON.

Witnesses:
A. E. H. JOHNSON,
J. W. HAMILTON JOHNSON.